United States Patent
Zhang et al.

(10) Patent No.: US 11,570,021 B2
(45) Date of Patent: *Jan. 31, 2023

(54) PACKET PROCESSING METHOD AND NETWORK DEVICE IN HYBRID ACCESS NETWORK

(71) Applicant: HUAWEI TECHNOLOGIES CO., LTD., Guangdong (CN)

(72) Inventors: Mingui Zhang, Boulogne Billancourt (FR); Lianshu Zheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 229 days.

This patent is subject to a terminal disclaimer.

(21) Appl. No.: 17/009,587

(22) Filed: Sep. 1, 2020

(65) Prior Publication Data

US 2020/0403827 A1    Dec. 24, 2020

Related U.S. Application Data

(63) Continuation of application No. 16/403,237, filed on May 3, 2019, now Pat. No. 10,778,469, which is a
(Continued)

(30) Foreign Application Priority Data

Nov. 4, 2016    (CN) .......................... 201610977391.1

(51) Int. Cl.
*H04L 12/64*    (2006.01)
*H04L 1/18*    (2006.01)
(Continued)

(52) U.S. Cl.
CPC ........ *H04L 12/6418* (2013.01); *H04L 1/1642* (2013.01); *H04L 1/187* (2013.01);
(Continued)

(58) Field of Classification Search
CPC ....... H04L 1/187; H04L 1/1642; H04L 12/46; H04L 12/4633; H04L 12/6418;
(Continued)

(56) References Cited

U.S. PATENT DOCUMENTS 7,035,214 B1    4/2006 Seddigh et al.
7,146,428 B2    12/2006 Luo
(Continued)

FOREIGN PATENT DOCUMENTS

CN    103490972 A    1/2014
CN    105207858 A    12/2015
(Continued)

OTHER PUBLICATIONS

M. Zhang et al, Fl.ow Control. for Bonding Tunnel.s; draft-zhang-banana-tcp-in-bonding-tunnel.s-00.txt, Banana, Mar. 21, 2016, 6 pages.
(Continued)

*Primary Examiner* — Michael Thier
*Assistant Examiner* — Prince A Mensah
(74) *Attorney, Agent, or Firm* — Womble Bond Dickinson (US) LLP

(57) ABSTRACT

A packet processing method and a network device in a hybrid access network. The method comprises sending, by a first network device, a first data packet in a first sending window to a second network device by using a first tunnel. In response to receiving a first acknowledgement response sent by the second network device, increasing, by the first network device, a size of the first sending window based on a first proportion. In response to not receiving, within a first predetermined time, the first acknowledgement response, decreasing the size of the first sending window based on a second proportion; and in response to determining that the size of the first sending window is greater than or equal to
(Continued)

a first threshold, sending a second data packet to a second receiving window of the second network device by using a second sending window.

20 Claims, 7 Drawing Sheets

Related U.S. Application Data continuation of application No. PCT/CN2017/099335, filed on Aug. 28, 2017.

(51) Int. Cl.
| | | |
|---|---|---|
| H04L 1/16 | (2006.01) | |
| H04L 12/46 | (2006.01) | |
| H04L 47/41 | (2022.01) | |
| H04L 47/26 | (2022.01) | |
| H04L 47/76 | (2022.01) | |
| H04L 47/125 | (2022.01) | |
| H04L 41/0896 | (2022.01) | |

(52) U.S. Cl.
CPC .......... *H04L 12/46* (2013.01); *H04L 12/4633* (2013.01); *H04L 41/0896* (2013.01); *H04L 47/125* (2013.01); *H04L 47/26* (2013.01); *H04L 47/41* (2013.01); *H04L 47/76* (2013.01); *H04L 2012/6421* (2013.01); *H04L 2012/6427* (2013.01); *H04L 2012/6464* (2013.01); *H04L 2012/6489* (2013.01); *H04L 2012/6497* (2013.01); *H04L 2212/00* (2013.01)

(58) Field of Classification Search
CPC ..... H04L 41/0896; H04L 47/26; H04L 47/41; H04L 47/76; H04L 47/125; H04L 2012/6421; H04L 2012/6427; H04L 2012/6464; H04L 2012/6497; H04L 2212/00
See application file for complete search history.

(56) References Cited

U.S. PATENT DOCUMENTS

| | | | |
|---|---|---|---|
| 8,340,099 B2* | 12/2012 | Black | H04L 43/0888 |
| | | | 370/395.2 |
| 8,576,711 B1* | 11/2013 | Roskind | H04L 69/163 |
| | | | 370/231 |
| 2005/0254420 A1 | 11/2005 | Wager et al. | |
| 2007/0076626 A1 | 4/2007 | Wise et al. | |
| 2007/0133418 A1 | 6/2007 | Agarwal | |
| 2009/0034416 A1* | 2/2009 | Baron | H04L 69/16 |
| | | | 370/476 |
| 2009/0316719 A1 | 12/2009 | Baron et al. | |
| 2013/0272293 A1 | 10/2013 | Nguyen et al. | |
| 2014/0223072 A1 | 8/2014 | Shivashankaralah et al. | |
| 2015/0131449 A1* | 5/2015 | Kojima | H04L 47/40 |
| | | | 370/236 |
| 2016/0044392 A1* | 2/2016 | Surek | H04J 3/1652 |
| | | | 398/45 |
| 2016/0080755 A1* | 3/2016 | Toma | H04N 19/44 |
| | | | 375/240.25 |
| 2016/0345207 A1* | 11/2016 | Kwak | H04L 47/30 |
| 2017/0099161 A1 | 4/2017 | Liu et al. | |
| 2017/0126845 A1* | 5/2017 | Pole | H04L 43/16 |
| 2018/0115487 A1* | 4/2018 | Thubert | H04L 65/60 |
| 2019/0045562 A1 | 2/2019 | Liu et al. | |

FOREIGN PATENT DOCUMENTS

| | | |
|---|---|---|
| CN | 105376173 A | 3/2016 |
| CN | 105657748 A | 6/2016 |

OTHER PUBLICATIONS

M. Cullen et al, Problem Statement: Bandwidth Aggregation for Internet Access; draft-zhang-banana-problem-statement-02.txt, Jul. 4, 2016, pp. 1-15, XP015113872.
J. You et al, Tiaffic Distribution for GRE Tunnel Bonding;draft-you-traffic-distribution-for-bonding-00.txt, Mar. 21, 2016, pp. 1-8, XP015112046.
N. Leymann et al, GRE Tunnel Bonding draft-zhang-gre-tunnel-bonding-00.txt. Jul. 6, 2015, 39 pages.

* cited by examiner

US 11,570,021 B2

PACKET PROCESSING METHOD AND NETWORK DEVICE IN HYBRID ACCESS NETWORK

CROSS-REFERENCE TO RELATED APPLICATIONS

This application continuation of U.S. patent application Ser. No. 16/403,237, filed on May 3, 2019, which is a continuation of International Application No. PCT/CN2017/099335, filed on Aug. 28, 2017, which claims priority to Chinese Patent Application No. 201610977391.1, filed on Nov. 4, 2016. All of the aforementioned applications are hereby incorporated by reference in their entireties.

TECHNICAL FIELD

This application relates to the field of communications technologies, and in particular, to a packet processing method and a network device in a hybrid access network.

BACKGROUND

A hybrid access (HA) network means connecting and binding different access networks for use by a same user. The hybrid access network can enable a user to experience use of a high-speed network. For example, two different types of access networks are a digital subscriber line (DSL) and Long Term Evolution (LTE). Currently, a possible manner of implementing HA is as follows: An operator-side network device and a user-side network device are bound by using a generic routing encapsulation (GRE) tunnel, to implement application of a hybrid access network. The operator-side network device may be a hybrid access aggregation point (HAAP), and is configured to bind and connect different access networks, to provide high-speed Internet access for a user. The user-side network device may be a home gateway (HG), and can allow simultaneous access of two different types of access networks, for example, can allow simultaneous access of a fixed broadband network and a mobile network.

In the prior art, in a hybrid access network, load sharing is implemented based on a token bucket. Two types of access networks, namely, a DSL and LTE, are used as an example. Two links between a HAAP and HG are considered as two tunnels, that is, a DSL tunnel and an LTE tunnel. A transmit end determines a color of a packet based on bandwidth of the DSL tunnel and bandwidth of the LTE tunnel by using a coloring mechanism, and determines, based on the color, whether to send the packet by using the DSL tunnel or the LTE tunnel.

As shown in FIG. 1, the transmit end maintains two token buckets: a DSL token bucket (shown in FIG. 1 by using leftward slashes) and an LTE token bucket (shown in FIG. 1 by using rightward slashes). Sizes of the two token buckets are determined based on the bandwidth of the DSL tunnel and the bandwidth of the LTE tunnel. A packet entering the DSL token bucket is marked in green (shown in FIG. 1 by using leftward slashes). A packet beyond a receiving capability of the DSL token bucket enters the LTE token bucket, and the data packet entering the LTE token bucket is marked in yellow (shown in FIG. 1 by using rightward slashes). Finally, a packet in green is sent by using the DSL tunnel, and a packet in yellow is sent by using the LTE tunnel.

Assuming that the bandwidth of the DSL tunnel and the bandwidth of the LTE tunnel are fixed, the foregoing token bucket-based load sharing mechanism cannot be used to adjust a load splitting proportion based on a dynamic change of the bandwidth of the DSL tunnel and the bandwidth of the LTE tunnel. When congestion occurs in the DSL tunnel, load is still injected into the DSL tunnel based on the fixed bandwidth of the DSL tunnel, and the LTE tunnel cannot be properly used by a user even though the LTE tunnel is idle. Consequently, not only a transmission error such as a packet loss is caused, but also system resource utilization is reduced to a large extent, and a hybrid access technology cannot be implemented.

SUMMARY

Embodiments of this application provide a packet processing method and a network device in a hybrid access network, to implement load balancing and real-time monitoring on network bandwidth, thereby relieving primary link congestion caused by a network emergency, and improving network bandwidth.

The specific technical solutions provided in the embodiments of this application are as follows.

According to a first aspect, a packet processing method in a hybrid access network is provided, where the hybrid access network includes a first network device and a second network device, and a first tunnel and a second tunnel are established between the first network device and the second network device. The first network device includes a first cache and a second cache. The first cache is configured to store a first sending window, and the second cache is configured to store a second sending window. First, the first network device sends a data packet in the first sending window to the second network device by using the first tunnel. Then, the first network device dynamically adjusts a size of the first sending window based on an acknowledgement response fed back by the second network device. When the size of the first sending window is greater than or equal to a first threshold, a subsequently received data packet enters the second sending window, and is sent to the second network device by using the second tunnel. In this way, load balancing and real-time monitoring on network bandwidth can be implemented, thereby relieving primary link congestion caused by a network emergency, and improving network bandwidth.

In a possible implementation, the first network device sends a first data packet in the first sending window to the second network device by using the first tunnel, where the first data packet carries a first sub-link number, and the first sub-link number is used to represent a sequence number of the first data packet in the first tunnel. In response to receiving a first acknowledgement response sent by the second network device, the first network device increases the size of the first sending window based on a first proportion. The first acknowledgement response carries a first acknowledgement number, the first acknowledgement number is obtained based on the first sub-link number, and the first acknowledgement number is used to notify the first network device that the second network device has received the first data packet. In response to not receiving, within a first predetermined time, the first acknowledgement response sent by the second network device, the first network device decreases the size of the first sending window based on a second proportion. The second proportion is greater than the first proportion. Then the first network device receives a second data packet, where a next hop through which the second data packet passes to arrive at a destination address is the second network device. When determining that the size of the first sending window is greater than or equal to the first threshold, the first network device stores the second data packet into the second cache, so that the second data packet enters the second sending window. The first network device sends the second data packet to the second network device by using the second tunnel. In this way, the first network device controls, in a "slow increase" and "rapid decrease" manner, a sending rate based on a status of receiving a data packet by the second network device, to properly allocate traffics to the first tunnel and the second tunnel based on an actual network condition. This avoids improper load sharing caused by congestion occurring in the first tunnel due to a network emergency, thereby properly using network bandwidth.

In a possible implementation, a priority of the first tunnel is higher than that of the second tunnel. Before the first network device sends the first data packet in the first sending window to the second network device by using the first tunnel, the first network device determines that the size of the first sending window is less than the first threshold, and the first network device stores the first data packet into the first cache, so that the first data packet enters the first sending window. Priority setting helps better use a primary link with good network transmission quality, thereby improving communication efficiency.

In a possible implementation, the first acknowledgement response is a third data packet or a first generic routing encapsulation GRE control packet sent by the second network device to the first network device. Therefore, more possible manners of feeding back an acknowledgement response are provided.

In a possible implementation, the first acknowledgement response is the third data packet. The third data packet includes an acknowledgement number field, and the acknowledgement number field carries the first acknowledgement number. Therefore, after the second network device receives the first data packet, if the second network device needs to send the third data packet to the first network device, the second network device may add the first acknowledgement number to the third data packet. After receiving the third data packet, the first network device parses the third data packet, and determines, based on the first acknowledgement number, that the second network device has received the first data packet. The second network device feeds back an acknowledgement response by using a data packet sent to the first network device, so that the second network device does not need to additionally send a packet to feed back the acknowledgement response. This decreases a quantity of packets exchanged between the first network device and the second network device, and saves bandwidth resources.

In a possible implementation, the first acknowledgement response is a first GRE control packet. The first GRE control packet includes an acknowledgement packet attribute field, and the acknowledgement packet attribute field includes an attribute type attribute type field, an attribute length attribute length field, and an acknowledgement number acknowledgement number field. The attribute type field indicates that a type of the acknowledgement packet attribute field is a type of notifying that a data packet is received, and the acknowledgement number field is used to carry the first acknowledgement number. Advertising an acknowledgement number by using a GRE control packet implements real-time monitoring and automatic adjustment on network bandwidth without manual intervention.

In a possible implementation, the second network device includes a third cache, where the third cache is configured to store a first receiving window. Before the first network device sends the first data packet in the first sending window to the second network device by using the first tunnel, the first network device receives a notification packet sent by the second network device, where the notification packet is used to notify a size of the first receiving window, and the size of the first receiving window is M. In response to receiving the notification packet, the first network device sets the size of the first sending window to L, where L<M, and both L and M are greater than 0.

In a possible implementation, the size of the first sending window is half of the size of the first receiving window, and a size of the second sending window is half of a size of a second receiving window.

In a possible implementation, the notification packet is a second GRE control packet. The second GRE control packet includes a window size attribute window size attribute field, and the window size attribute field includes an attribute type field, an attribute length field, and a window size window size field. The attribute type field indicates that a type of the window size attribute field is a type of notifying a window size, and the window size field is used to carry the size of the first receiving window. Advertising a window size by using a GRE control packet implements automatic setting and adjustment on a sending window without manual intervention.

In a possible implementation, the second data packet carries a second sub-link number, where the second sub-link number is used to represent a sequence number of the second data packet in the second tunnel. After the first network device sends the second data packet in the second sending window to the second network device by using the second tunnel, in response to receiving a second acknowledgement response sent by the second network device, the first network device increases the size of the second sending window based on a third proportion. The second acknowledgement response carries a second acknowledgement number, the second acknowledgement number is obtained based on the second sub-link number, and the second acknowledgement number is used to notify the first network device that the second network device has received the second data packet. In response to not receiving, within a second predetermined time, the second acknowledgement response sent by the second network device, the first network device decreases the size of the second sending window based on a fourth proportion. The fourth proportion is greater than the third proportion. In this way, the first network device controls, in a "slow increase" and "rapid decrease" manner, a sending rate based on a status of receiving a data packet by the second network device.

In a possible implementation, after receiving the second data packet, the second network device obtains the second sub-link number carried in the received second data packet, and adds the second acknowledgement number to the second acknowledgement response returned to the first network device. The second acknowledgement number is obtained based on the second sub-link number.

In a possible implementation, the second acknowledgement response may be a fourth data packet sent by the second network device to the first network device, where the fourth data packet includes an acknowledgement number field, and the acknowledgement number field carries the second acknowledgement number. In a possible implementation, the second acknowledgement number is the same as the second sub-link number. The second network device feeds back an acknowledgement response by using a data packet sent to the first network device, so that the second network device does not need to additionally send a packet to feed back the acknowledgement response. This decreases a quantity of packets exchanged between the first network device and the second network device, and saves bandwidth resources.

In a possible implementation, the second acknowledgement response may alternatively be a third GRE control packet. After receiving the second data packet sent by the first network device, the second network device notifies, by using the third GRE control packet sent to the first network device, the first network device that the second data packet has been received.

In a possible implementation, the third GRE control packet includes an acknowledgement packet attribute field, and the acknowledgement packet attribute field includes an attribute type attribute type field, an attribute length attribute length field, and an acknowledgement number acknowledgement number field. The attribute type field indicates that a type of the acknowledgement packet attribute field is a type of notifying that a data packet is received, and the acknowledgement number field is used to carry the second acknowledgement number. Advertising an acknowledgement number by using a GRE control packet implements real-time monitoring and automatic adjustment on network bandwidth without manual intervention.

According to a second aspect, a packet processing method in a hybrid access network is provided, where the hybrid access network includes a first network device and a second network device, a first tunnel and a second tunnel are established between the first network device and the second network device, and the first tunnel and the second tunnel are bound and connected to form a virtual binding tunnel. The first network device includes a first cache and a second cache, the first cache is configured to store a first sending window, and the second cache is configured to store a second sending window. The second network device includes a sorting cache. After receiving a data packet sent by the first network device, the second network device feeds back an acknowledgement response to the first network device, to notify the first network device that the data packet has been received, so that the first network device dynamically adjusts sizes of the sending windows. In this way, load balancing and real-time monitoring on network bandwidth can be implemented, thereby relieving primary link congestion caused by a network emergency, and improving network bandwidth.

In a possible implementation, the second network device receives a first data packet that is in the first sending window and that is sent by the first network device by using the first tunnel, where the first data packet carries a first sub-link number and a first global number. The first sub-link number is used to represent a sequence number of the first data packet in the first tunnel. The first global number represents a sequence number of the first data packet in the virtual binding tunnel. The second network device receives a second data packet that is in the second sending window and that is sent by the first network device by using the second tunnel. The second data packet carries a second sub-link number and a second global number. The second sub-link number is used to represent a sequence number of the second data packet in the second tunnel, and the second global number is used to represent a sequence number of the second data packet in the virtual binding tunnel. The second network device stores the first data packet and the second data packet into the sorting cache, and sorts the first data packet and the second data packet based on the first global number and the second global number. In response to storing, by the second network device, the first data packet into the sorting cache, the second network device sends a first acknowledgement response to the first network device, so that the first network device increases a size of the first sending window based on a first proportion after receiving the first acknowledgement response. The first acknowledgement response carries a first acknowledgement number. The first acknowledgement number is obtained based on the first sub-link number. The first acknowledgement number is used to notify the first network device that the second network device has received the first data packet.

In response to storing, by the second network device, the second data packet into the sorting cache, the second network device sends a second acknowledgement response to the first network device, so that the first network device increases a size of the second sending window based on a third proportion after receiving the second acknowledgement response. The second acknowledgement response carries a second acknowledgement number, the second acknowledgement number is obtained based on the second sub-link number, and the second acknowledgement number is used to notify the first network device that the second network device has received the second data packet. The second network device may accurately notify the first network device of the received data packet, so that the first network device dynamically adjusts tunnel bandwidth, and controls a sending rate of the first sending window, to avoid improper load sharing caused by congestion occurring due to a network emergency, thereby properly using network bandwidth.

In a possible implementation, the first acknowledgement response is a third data packet or a first generic routing encapsulation GRE control packet sent by the second network device to the first network device. Therefore, more possible manners of feeding back an acknowledgement response are provided.

In a possible implementation, the first acknowledgement response is the third data packet. The third data packet includes an acknowledgement number field, and the acknowledgement number field carries the first acknowledgement number. The second network device feeds back an acknowledgement response by using a data packet sent to the first network device, so that the second network device does not need to additionally send a packet to feed back the acknowledgement response. This decreases a quantity of packets exchanged between the first network device and the second network device, and saves bandwidth resources.

In a possible implementation, the first acknowledgement response is a first GRE control packet, the first GRE control packet includes an acknowledgement packet attribute TLV field, and the acknowledgement packet attribute TLV field is used to carry the first acknowledgement number. Advertising an acknowledgement number by using a GRE control packet implements real-time monitoring and automatic adjustment on network bandwidth without manual intervention.

In a possible implementation, before the second network device receives, by using the first tunnel, the first data packet sent by the first network device, the second network device sends a first notification packet to the first network device. The first notification packet is used to notify a size of a first receiving window, and the size of the first receiving window is used by the first network device to set the size of the first sending window. Before the second network device receives, by using the second tunnel, the second data packet sent by the first network device, the second network device sends a second notification packet to the first network device. The second notification packet is used to notify a size of a second receiving window, and the size of the second receiving window is used by the first network device to set the size of the second sending window.

In a possible implementation, the first notification packet is a second GRE control packet, and the second notification packet is a fourth GRE control packet. The second GRE control packet includes a window size attribute window size attribute TLV field. The fourth GRE control packet includes a window size attribute window size attribute TLV field. The window size attribute TLV field in the second GRE control packet is used to carry the size of the first receiving window. The window size attribute TLV field in the fourth GRE control packet is used to carry the size of the second receiving window. Advertising a window size by using a GRE control packet implements automatic setting and adjustment on a sending window without manual intervention.

According to a third aspect, a first network device in a hybrid access network is provided, where the first network device has functions of implementing behaviors of the first network device in any one of the first aspect or the possible implementations of the first aspect. The functions may be implemented by using hardware, or may be implemented by executing corresponding software by hardware. The hardware or the software includes one or more modules corresponding to the functions.

According to a fourth aspect, a second network device in a hybrid access network is provided, where the second network device has functions of implementing behaviors of the second network device in any one of the second aspect or the possible implementations of the second aspect. The functions may be implemented by using hardware, or may be implemented by executing corresponding software by hardware. The hardware or the software includes one or more modules corresponding to the functions.

According to a fifth aspect, a first network device in a hybrid access network is provided, where the first network device includes a transceiver, a processor, a memory, and the processor and the memory are connected to each other by using a bus system. The processor is configured to execute code in the memory, and when the code is executed, the processor performs the method in any one of the first aspect or the possible implementations of the first aspect.

According to a sixth aspect, a second network device in a hybrid access network is provided, where the second network device includes a transceiver, a processor, a memory, and the processor and the memory are connected to each other by using a bus system. The processor is configured to execute code in the memory, and when the code is executed, the processor performs the method in any one of the second aspect or the possible implementations of the second aspect.

According to a seventh aspect, a communications system is provided, where the communications system includes the first network device in the third aspect or the fifth aspect and the second network device in the fourth aspect or the sixth aspect.

According to an eighth aspect, a computer storage medium is provided, and is configured to store a computer program. The computer program includes an instruction used to perform the method in any one of the first aspect, the second aspect, the possible implementations of the first aspect, or the possible implementations of the second aspect.

The embodiments of this application provide a packet processing method and a network device in a hybrid access network. The first network device adjusts bandwidth of different links of the first network device based on information fed back by the second network device, and guides, to another link in a timely manner, an overflow traffic from a primary link. This relieves primary link congestion caused by a network emergency while improving network bandwidth.

DESCRIPTION OF EMBODIMENTS

Figure 1:
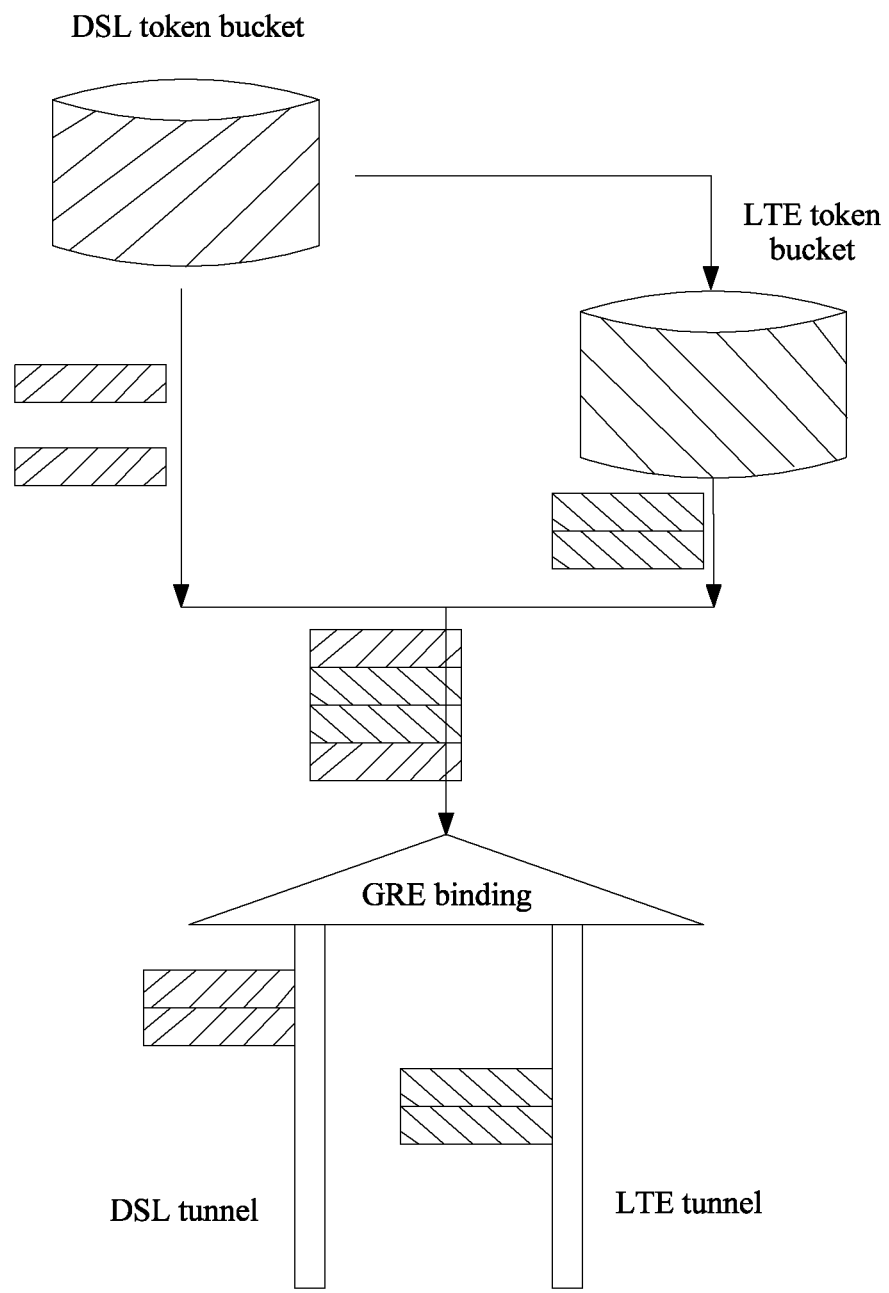
FIG. 1 is a schematic diagram of implementing load sharing based on a token bucket in the prior art.

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

Unless otherwise stated, ordinal numbers such as "first", "second", "third", and "fourth" mentioned in the embodiments of this application are used to distinguish between a plurality of objects, and are not intended to limit a sequence of the plurality of objects.

The embodiments of this application may be applied to a hybrid access network. In the embodiments of this application, the hybrid access network includes a first network device and a second network device, and two links are established between the first network device and the second network device. Data packets and/or control packets are separately transmitted on the two links. A link may be considered as a tunnel. In other words, two tunnels are established between the first network device and the second network device: a first tunnel and a second tunnel. The first tunnel and the second tunnel are bound and connected to form a virtual binding tunnel. It may be understood that all data packets exchanged between the first network device and the second network device are transmitted by using the virtual binding tunnel, and all the data packets include data packets transmitted by using the first tunnel and the second tunnel. Specifically, for example, the virtual binding tunnel may be a GRE tunnel, a Point-to-Point Tunneling Protocol (PPTP) tunnel, or a user datagram protocol (UDP) tunnel. This is not specifically limited in this application.

In the embodiments of this application, a first sending window may be understood as a data packet sequence that is to be sent by using the first tunnel and that is buffered in the first network device. A second sending window may be understood as a data packet sequence that is to be sent by using the first tunnel and that is buffered in the first network device. A first receiving window may be understood as a data packet sequence, in the first sending window, that is sent by using the first tunnel and received and buffered by the second network device and that has not entered a sorting cache. A second receiving window may be understood as a data packet sequence, in the second sending window, that is sent by using the second tunnel and received and buffered by the second network device and that has not entered the sorting cache. The sorting cache may be understood as a cache used by the second network device to sort all data packet sequences received by using the virtual binding tunnel. A window size may be understood as a data packet sequence length that can be accommodated. Definitions of a sending window and a receiving window comply with stipulations in the Transmission Control Protocol (TCP). Sending windows and receiving windows on all tunnels are independently managed. The first network device includes a first cache and a second cache. The first cache is configured to store the first sending window, and the second cache is configured to store the second sending window. The second network device includes a third cache and a fourth cache. The third cache is configured to store the first receiving window, and the second cache is configured to store the second receiving window.

Application scenarios described in the embodiments of this application are intended to describe the technical solutions in the embodiments of this application more clearly, but are not intended to limit the technical solutions provided in the embodiments of this application. Persons of ordinary skill in the art may learn that with evolution of network architectures and emergence of a new service scenario, the technical solutions provided in the embodiments of this application are also applicable to a similar technical problem.

Figure 2:
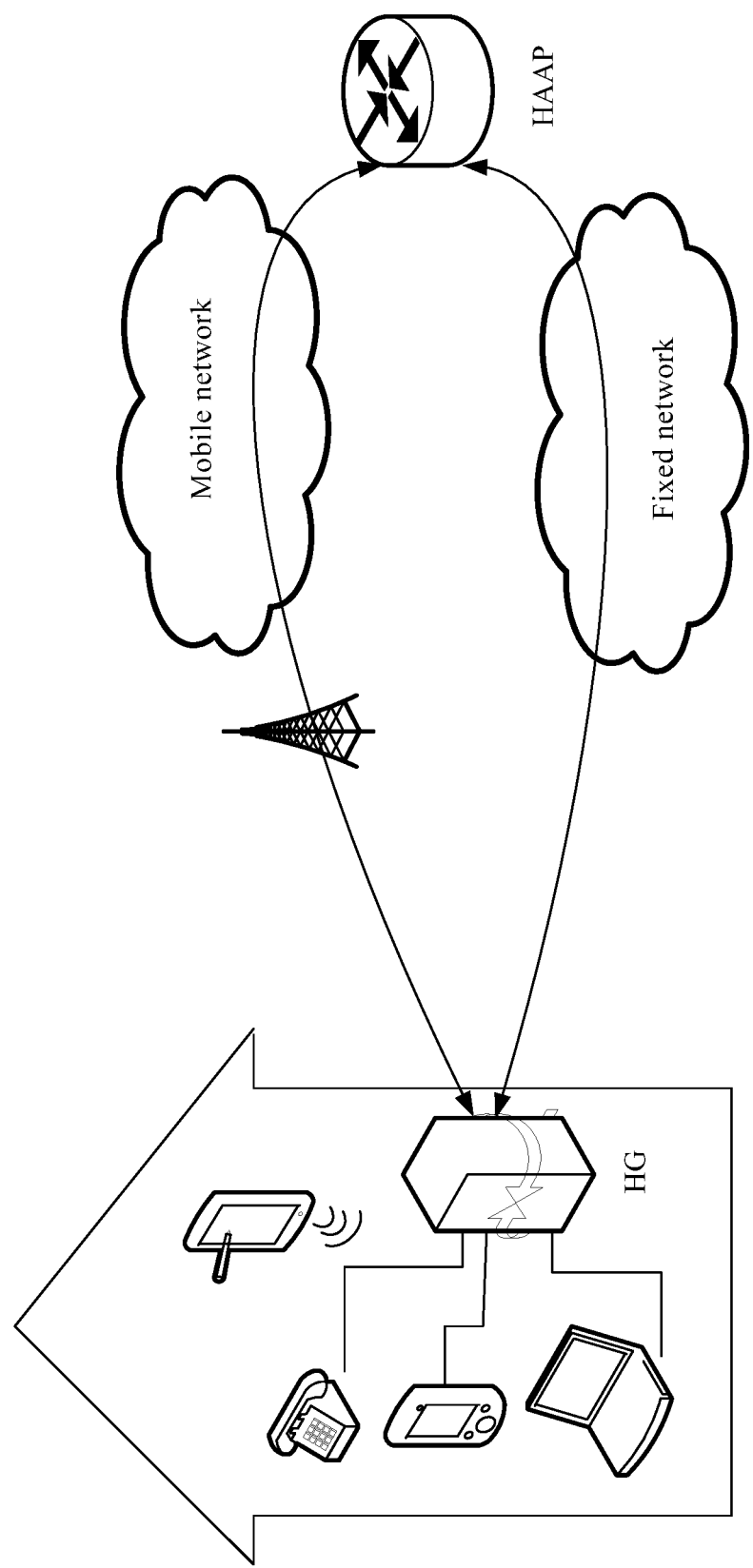
FIG. 2 is a schematic diagram of an architecture of an HA network according to an embodiment of this application.

FIG. 2 shows an example of a possible architecture of a hybrid access network. A first network device is a user-side network device HG, and a second network device is an operator-side network device HAAP. Alternatively, the first network device is an operator-side network device HAAP, and the second network device is a user-side network device HG. The user-side network device HG can provide, for a user, access to at least two types of access networks. As shown in FIG. 2, the user-side network device HG provides a fixed network such as a DSL for a terminal device such as a mobile phone, a computer, or a fixed-line phone, and provides access to a mobile network such as LTE for a handheld device with a wireless communication function. The operator-side network device HAAP provides high-speed hybrid network access for a user.

Hybrid access between the HG and the HAAP is implemented by using a virtual binding tunnel. Global numbers are used for all packets sent by the first network device. The global numbers are used to represent sequence numbers, in virtual binding tunnel, of all the data packets sent by the first network device. All the packets include a packet transmitted in a DSL tunnel and a packet transmitted in an LTE tunnel. The second network device restores a packet sequence based on the global numbers, so as to implement a data transmission mechanism of a hybrid access network between the HG and the HAAP. An application scenario in the hybrid access network shown in FIG. 2 is merely an example, and an actual hybrid access network may further include another structure form. This is not limited in this application.

A packet processing method and a network device in a hybrid access network provided in the embodiments of this application are described in detail below based on the hybrid access network architecture shown in FIG. 2 and with reference to the accompanying drawings.

It should be noted that data is sent between the first network device and the second network device by using the first tunnel and the second tunnel, or data may be sent by using more than two tunnels. In the embodiments of this application, two tunnels are used as an example for description.

Figure 3:
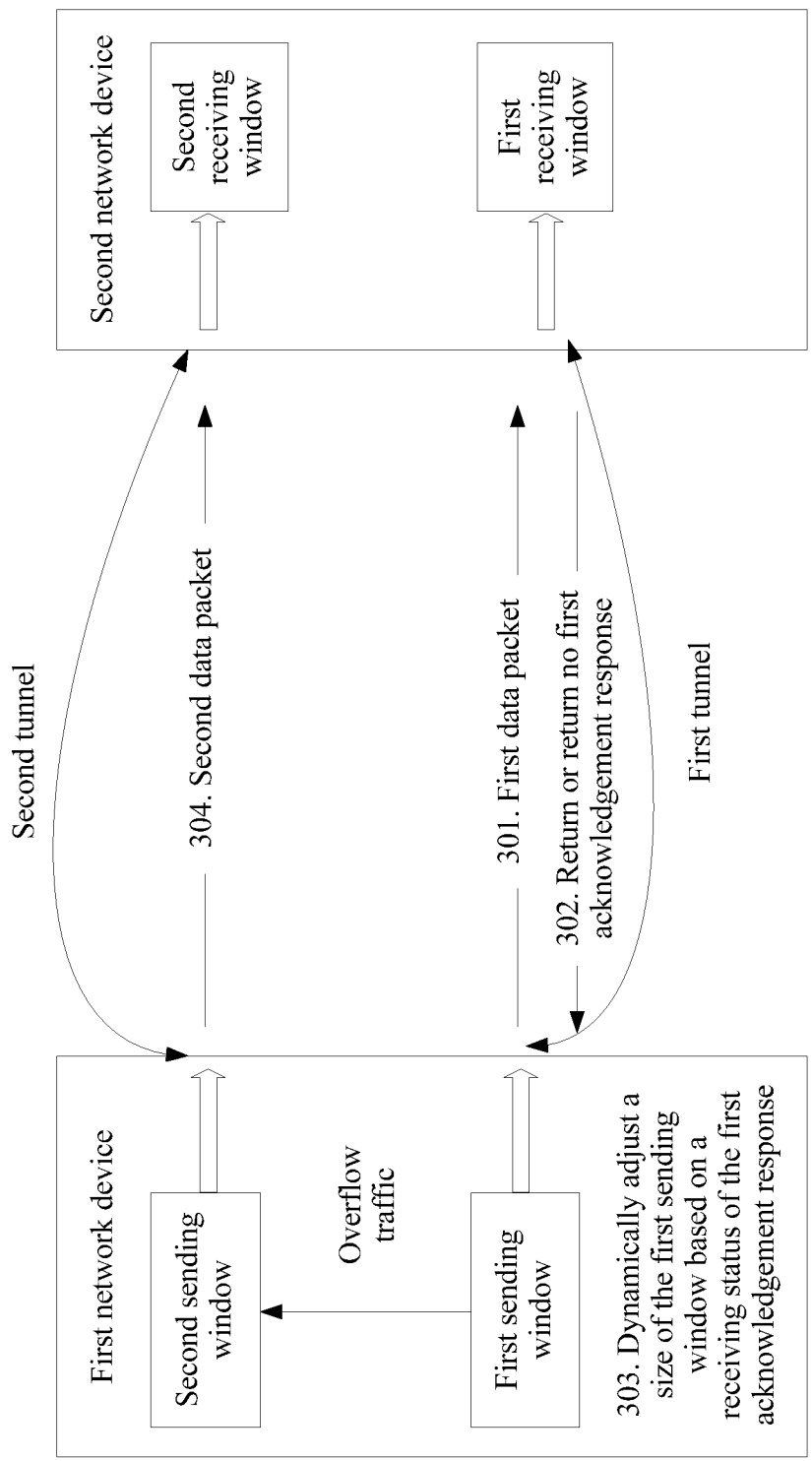
FIG. 3 is a schematic flowchart of a packet processing method in a hybrid access network according to an embodiment of this application.

Referring to FIG. 3, a process of a packet processing method in a hybrid access network according to an embodiment of this application is described below.

Step 301: A first network device sends a first data packet in a first sending window to a second network device by using a first tunnel.

Step 302: After receiving the first data packet, the second network device returns a first acknowledgement response to the first network device.

The first acknowledgement response is used to indicate that the second network device has received the first data packet sent based on the first sending window.

There is a special case herein: The second network device may not return the first acknowledgement response to the first network device due to the following reason: the second network device does not receive the first data packet sent by the first network device, the second network device encounters a parse error, or the like.

Step 303: The first network device dynamically adjusts a size of the first sending window based on a receiving status of the first acknowledgement response.

Specifically, in response to receiving the first acknowledgement response sent by the second network device, the first network device increases the size of the first sending window based on a first proportion.

The first network device may not receive the first acknowledgement response within a first predetermined time due to the following reason: link quality is poor, the second network device does not return the first acknowledgement response, or the like. In response to not receiving, within the first predetermined time, the first acknowledgement response sent by the second network device, the first network device decreases the size of the first sending window based on a second proportion. The second proportion is greater than the first proportion.

In a possible implementation, the first predetermined time is set to be greater than or equal to a sum of duration for transmitting the first data packet by the first network device to the second network device and duration for transmitting the first acknowledgement response by the second network device to the first network device.

Step 304: The first network device sends a second data packet to the second network device by using a second tunnel. In a possible implementation, a priority of the first tunnel is higher than that of the second tunnel. To be specific, when the first tunnel and the second tunnel are in normal link states, and when the first network device generates a to-be-sent data packet, the first network device preferentially sends the to-be-sent data packet by using the first tunnel. Specifically, a sequence of the priorities of the two tunnels may be determined based on delay priorities of the two tunnels, or may be determined based on sizes of the two sending windows. A specific priority determining manner is not limited in this application.

After receiving the first data packet, the first network device preferentially buffers the first data packet into the first cache when the first cache has buffer space, so that the first data packet enters the first sending window, and the first network device sends the data packet to the second network device by using the first tunnel. As described in step 303, the first network device dynamically adjusts the size of the first sending window based on the receiving status of the first acknowledgement response returned by the second network device. The first network device presets a first threshold for the size of the first sending window, and chooses, based on a value relationship between the size of the first sending window and the first threshold, whether to send the data packet by using the first sending window or the second sending window.

Correspondingly, before step 301 in which the first network device sends the first data packet in the first sending window to the second network device by using the first tunnel, in response to determining that the size of the first sending window is less than the first threshold, the first network device chooses to store the first data packet into the first cache, so that the first data packet enters the first sending window.

Correspondingly, before step 304 in which the first network device sends the second data packet by using the second tunnel, in response to determining that the size of the first sending window is greater than or equal to the first threshold, the first network device stores the second data packet into the second cache, so that the second data packet enters the second sending window.

In a specific implementation, the first threshold may be a maximum data packet sequence length that can be accommodated. However, this embodiment of this application is not limited thereto.

In a specific implementation, when the first network device receives a to-be-sent data packet, the first network device first determines a length of the to-be-sent data packet. If the length of the to-be-sent data packet is not greater than a size of current available storage space of the first cache, the first network device stores the to-be-sent data packet into the first cache, so that the to-be-sent data packet enters the first sending window; and the first network device sends the to-be-sent data packet to the second network device by using the first tunnel. Alternatively, if the length of the to-be-sent data packet is greater than a size of available storage space of the first cache, the first network device stores the to-be-sent data packet into the second cache, so that the to-be-sent data packet enters the second sending window; and the first network device sends the to-be-sent data packet to the second network device by using the second tunnel. In this embodiment of this application, the first data packet carries a first sub-link number, and the second data packet carries a second sub-link number. The first sub-link number is used to represent a sequence number of the first data packet in the first tunnel, and the second sub-link number is used to represent a sequence number of the second data packet in the second tunnel. Specifically, a sequence number field of the first data packet sent by the first network device to the second network device is divided into two parts. One part is used to carry the first sub-link number (that is, a tunnel sequence number), and the other part is used to carry a global number (that is, a bonding sequence number) defined in an original data packet protocol. A sequence number field of the second data packet is divided into two parts. One part is used to carry the second sub-link number, and the other part is used to carry a global number defined in an original data packet protocol.

Global numbers are used to represent sequence numbers that are of all data packets sent by the first network device and that are in a virtual binding tunnel that is formed by binding and connecting the first tunnel and the second tunnel. All the data packets include data packets transmitted in the first tunnel and in the second tunnel. For ease of description, a first global number is used to represent a sequence number, in the virtual binding tunnel, of the first data packet in the first sending window. A second global number is used to represent a sequence number, in the virtual binding tunnel, of the second data packet in the second sending window. After receiving the first data packet and the second data packet, the second network device stores the first data packet and the second data packet into a sorting cache, and sorts the first data packet and the second data packet based on the first global number and the second global number. Specifically, first, after receiving the first data packet, the second network device stores the first data packet into a third cache, so that the first data packet enters a first receiving window. Then, data packets in the first receiving window, including the first data packet, enter the sorting cache. After receiving the second data packet, the second network device stores the second data packet into a fourth cache, so that the second data packet enters a second receiving window. Then, data packets in the second receiving window, including the second data packet, enter the sorting cache. In the sorting cache, the second network device sorts all data packets based on global numbers of all the data packets. As described above, it should be noted that in step 302, after receiving the first data packet and before returning the first acknowledgement response to the first network device, the second network device first stores the first data packet into the sorting cache, and then determines, based on the first global number carried in the first data packet, a location of the first data packet in the sorting cache. In this way, the second network device returns the first acknowledgement response only after the first data packet enters the sorting cache, so as to avoid congestion caused because not all data packets can be processed. In such a design, an actual network condition can be reflected to the first network device, so as to more properly use system bandwidth.

After receiving the first data packet, the second network device obtains the first sub-link number carried in the received first data packet, and adds a first acknowledgement number to the first acknowledgement response returned to the first network device. The first acknowledgement number is obtained based on the first sub-link number, and the first acknowledgement number is used to notify the first network device that the second network device has received the first data packet.

In a specific implementation, the first acknowledgement number and the first sub-link number are represented in a same manner. For example, after receiving the first data packet, the second network device obtains the first sub-link number carried in the first data packet, adds the first sub-link number to the first acknowledgement response as the first acknowledgement number, and returns the first acknowledgement response to the first network device. For example, the first sub-link number may be an Arabic number or a letter. This is not specifically limited in this application.

In another specific implementation, the first acknowledgement number is obtained based on a mapping relationship between the first acknowledgement number and the first sub-link number. In a specific implementation, the second network device may store a mapping relationship table, and the mapping relationship table is used to store the mapping relationship between the sub-link number and the acknowledgement number. The second network device obtains the first sub-link number, and obtains, based on the mapping relationship table, the first acknowledgement number corresponding to the first sub-link number. Correspondingly, the first network device also stores the mapping relationship table. For example, the mapping relationship may be established in the following manner: For example, the first sub-link number is an Arabic number 1, and the first acknowledgement number is a letter A mapped to the number 1. It should be noted that the foregoing manner of establishing the mapping relationship is merely an example, and the mapping relationship may be specifically established in a plurality of different manners. Any means that can be figured out by persons skilled in the art for establishing such a correspondence is covered in a mapping rule in this embodiment of this application. A specific form of the mapping relationship table may be implemented in a plurality of different manners. The correspondence may be expressed in a form of a table, or in another manner. This is not limited in this application.

The first network device can learn, by using the first acknowledgement number, that the second network device has received the first data packet with the first sub-link number corresponding to the first acknowledgement number.

The first network device and the second network device may transmit data packets to each other. In a possible implementation, the first acknowledgement response may be a data packet sent by the second network device to the first network device, and is denoted as a third data packet. A format of the third data packet is the same as that of each of the first data packet and the second data packet, and includes both a sub-link number and a global number. In addition, if the third data packet is the first acknowledgement response, the third data packet further includes an acknowledgement number field, and the acknowledgement number field carries the first acknowledgement number. In a possible implementation, the first acknowledgement number is the same as the first sub-link number.

The first acknowledgement response may alternatively be a GRE control packet (denoted as a first GRE control packet). After receiving the first data packet sent by the first network device, the second network device notifies, by using the GRE control packet sent to the first network device, the first network device that the first data packet has been received.

The first GRE control packet includes an acknowledgement packet attribute attribute field. The acknowledgement packet attribute field includes an attribute type-length-value (TLV) field, and specifically includes an attribute type attribute type field, an attribute length attribute length field, and an acknowledgement number acknowledgement number field. The attribute type field indicates that a type of the acknowledgement packet attribute field is a type of notifying that a data packet is received, and the acknowledgement number field is used to carry the first acknowledgement number.

In a possible implementation, after step 304 in which the first network device sends the second data packet to the second network device by using the second tunnel, the second network device receives the second data packet sent by the first network device by using the second tunnel, and the second network device returns a second acknowledgement response to the first network device.

The second acknowledgement response is used to indicate that the second network device has received the second data packet sent based on the second sending window.

There is a special case herein: The second network device may not return the second acknowledgement response to the first network device due to the following reason: the second network device does not receive the second data packet sent by the first network device, the second network device encounters a parse error, or the like.

The first network device dynamically adjusts a size of the second sending window based on a receiving status of the second acknowledgement response.

Specifically, in response to receiving the second acknowledgement response sent by the second network device, the first network device increases the size of the second sending window based on a third proportion.

The first network device may not receive the second acknowledgement response within a second predetermined time due to the following reason: link quality is poor, the second network device does not return the second acknowledgement response, or the like. In response to not receiving, within the second predetermined time, the second acknowledgement response sent by the second network device, the first network device decreases the size of the second sending window based on a fourth proportion. The fourth proportion is greater than the third proportion.

In a possible implementation, the second predetermined time is set to be greater than or equal to a sum of duration for transmitting the second data packet by the first network device to the second network device and duration for transmitting the second acknowledgement response by the second network device to the first network device.

After receiving the second data packet, the second network device obtains the second sub-link number carried in the received second data packet, and adds a second acknowledgement number to the second acknowledgement response returned to the first network device. The second acknowledgement number and the second sub-link number are mapped to each other.

The first network device can learn, by using the second acknowledgement number, that the second network device has received the second data packet with the second sub-link number corresponding to the second acknowledgement number.

The second acknowledgement response may be a fourth data packet sent by the second network device to the first network device. A format of the fourth data packet is the same as that of each of the third data packet, the first data packet, and the second data packet. The fourth data packet includes an acknowledgement number field, and the acknowledgement number field carries the second acknowledgement number. In a possible implementation, the second acknowledgement number is the same as the second sub-link number.

The second acknowledgement response may alternatively be a GRE control packet (denoted as a third GRE control packet) that has a same format as the first GRE control packet. After receiving the second data packet sent by the first network device, the second network device notifies, by using the third GRE control packet sent to the first network device, the first network device that the second data packet has been received.

The third GRE control packet includes an acknowledgement packet attribute attribute field. The acknowledgement packet attribute field includes an attribute type-length-value (TLV) field, and specifically includes an attribute type attribute type field, an attribute length attribute length field, and an acknowledgement number acknowledgement number field. The attribute type field indicates that a type of the acknowledgement packet attribute field is a type of notifying that a data packet is received, and the acknowledgement number field is used to carry the second acknowledgement number.

The following design may be used to set sizes of a sending window (including the first sending window and the second sending window) and a receiving window (including the first receiving window and the second receiving window).

The second network device determines the size of the first receiving window based on bandwidth of the first tunnel, and determines the size of the second receiving window based on bandwidth of the second tunnel. For example, the sizes of the receiving windows are determined in the following manner: receiving window size=bandwidth×delta value. The delta value is set by a network manager, and is usually set to 50 ms. The second network device sends a first notification packet to the first network device by using the first tunnel, and the first notification packet is used to notify a size M of the first receiving window. The second network device sends a second notification packet to the first network device by using the second tunnel, and the second notification packet is used to notify a size M' of the second receiving window.

In response to receiving the first notification packet, the first network device sets the size of the first sending window to L, where L<M. In response to receiving the second notification packet, the first network device sets the size of the second sending window to L', where L'<M', and L, L', M, and M' all are greater than 0. In a specific implementation, the size L of the first sending window is half of the size M of the first receiving window, and the size L' of the second sending window is half of the size M' of the second receiving window. However, this application is not limited thereto.

The first notification packet is a GRE control packet (denoted as a second GRE control packet). The second GRE control packet includes a window size attribute window size attribute field. The window size attribute field includes an attribute type-length-value (TLV) field, and specifically includes an attribute type field, an attribute length field, and a window size window size field. The attribute type field indicates that a type of the window size attribute field is a type of notifying a window size, and the window size field is used to carry the size of the first receiving window.

A format of the second notification packet is the same as a format of the first notification packet, and the second notification packet is denoted as a fourth GRE control packet. A window size field in the fourth GRE control packet is used to carry the size of the second receiving window.

It should be noted herein that a format of the first GRE control packet is the same as a format of the second GRE control packet, and the first network device determines, by using content carried in an attribute type field, whether a GRE control packet is a notification packet or an acknowledgement response.

The packet processing method in a hybrid access network shown in FIG. 3 is further described in detail below with reference to a specific application scenario.

It is assumed that the first network device is an HG, the second network device is an HAAP, the first tunnel is a DSL tunnel, and the second tunnel is an LTE tunnel.

The HAAP sets a size of an LTE receiving window of the LTE tunnel to 8 KBytes, and sets a size of a DSL receiving window of the DSL tunnel to 6 KBytes. The HAAP sends, to the HG, a GRE control packet that includes a window size field by using the first tunnel, and the HG learns, based on the window size field, that the size of the DSL receiving window of the DSL tunnel is set to 6 KBytes. The HAAP sends, to the HG, a GRE control packet that includes a window size field by using the second tunnel, and the HG learns, based on the window size field, that the size of the LTE receiving window of the LTE tunnel is set to 8 KBytes. Preferably, a size of a sending window is set to half of a size of a receiving window. The HG sets a size of a DSL sending window size of the DSL link to half of the size of the DSL receiving window, that is, 3 KBytes, and sets a size of an LTE sending window of the LTE link to half of the size of the LTE receiving window, that is, 4 KBytes.

Figure 4:
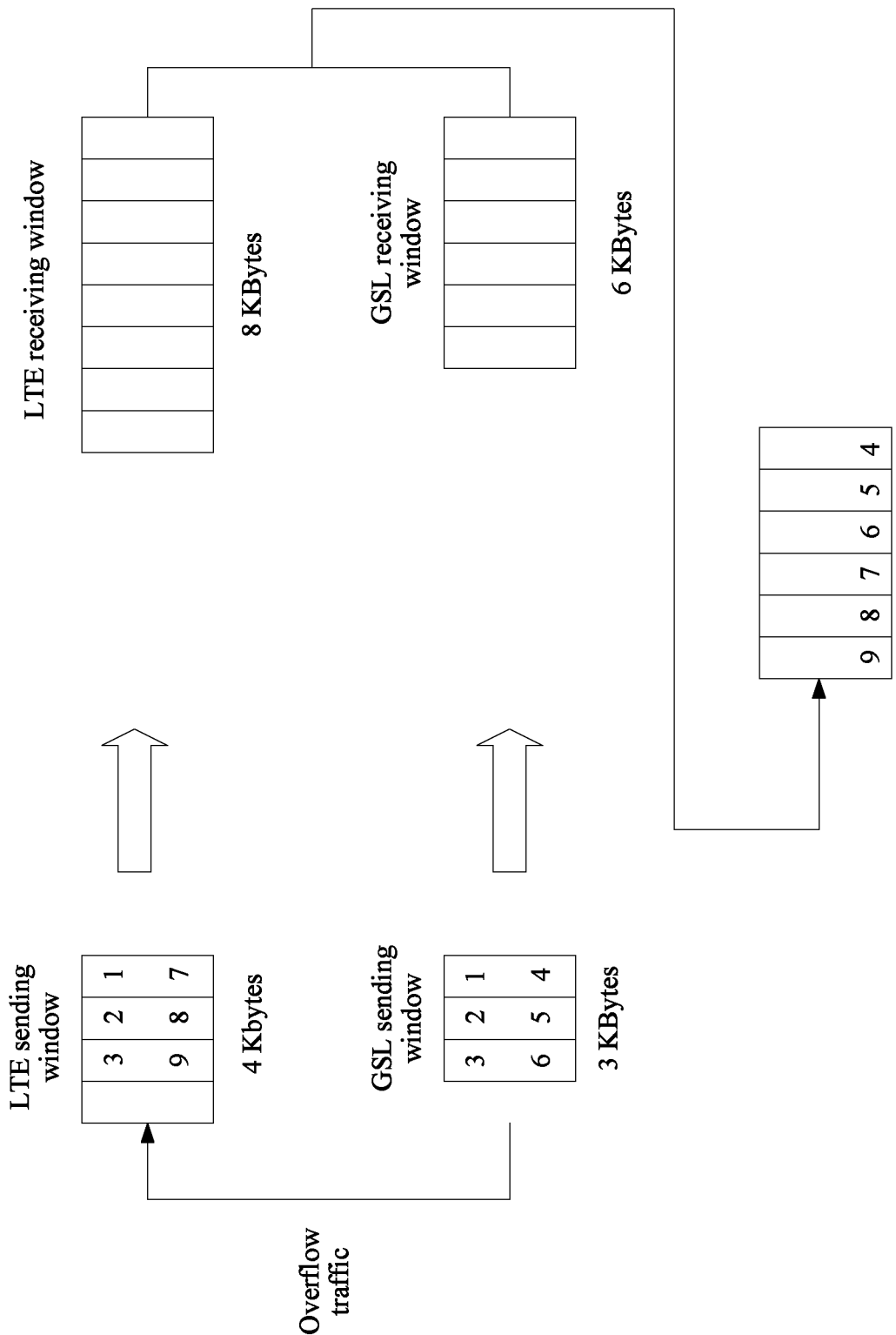
FIG. 4 is a schematic diagram of a sending device and a receiving window according to an embodiment of this application.

When the HG generates a to-be-sent data stream, load sharing is performed based on a size of the data stream and the sizes of the two sending windows. As shown in FIG. 4, it is assumed that global numbers of all data packets in the data stream are respectively 4, 5, 6, 7, 8, and 9, and a size of each data packet is 1 KByte. A current size of the DSL sending window is 3 KBytes, and a current size of the LTE sending window is 4 KBytes. Because a priority of the DSL tunnel is higher than that of the LTE tunnel, the data packets in the to-be-sent data stream are first placed in a DSL cache corresponding to the DSL sending window. When the DSL cache corresponding to the DSL sending window is full, an overflow traffic is placed in an LTE cache corresponding to the LTE sending window. The data packets with the global numbers 4, 5, and 6 in the DSL sending window are sent in sequence by using the DSL tunnel, and DSL sub-link numbers 1, 2, and 3 are sequentially added to the data packets with the global numbers are 4, 5, and 6. Data packets with the global numbers 7, 8, and 9 in the LTE sending window are sent by using the LTE tunnel, and LTE sub-link numbers 1, 2, and 3 are sequentially added to the data packets with the global numbers are 7, 8, and 9.

Figure 5:
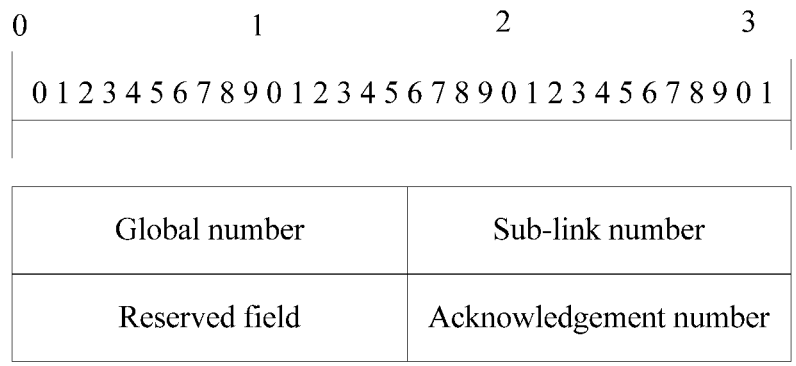
FIG. 5 is a schematic diagram of data packet protocol extension according to an embodiment of this application.

Specifically, the sub-link numbers may be carried through data packet protocol extension. FIG. 5 shows an extension field of a data packet exchanged between the HG and the HAAP. An original sequence number field in the data packet is divided into two parts. One part is a sub-link number representing a sequence number of the data packet in the first tunnel or the second tunnel, and the other part is a global number representing a sequence number of the data packet in an entire binding tunnel.

The data packets in the two sending windows are separately sent by using the DSL tunnel and the LTE tunnel. The HAAP separately receives data packets transferred from the tunnels. The HAAP returns an acknowledgement response to the HG each time the HAAP receives a data packet. The acknowledgement response may be a data packet sent by the HAAP to the HG. In this case, the HAAP adds an acknowledgement number field to the data packet through data packet protocol extension. In a possible implementation, the HAAP uses, as an acknowledgement number, a sub-link number carried in a received data packet sent by the HG.

Both the HAAP and the HG each may be both a sending device and a receiving device. Therefore, as shown in FIG. 5, a 32-bit sequence number field is divided into two parts, and after data packet protocol extension is performed, each of data packets sent by the two parties includes a global number, a sub-link number, and an acknowledgement number. All bits in a reserved field are set to 0 during sending of a data packet.

In addition, the acknowledgement response may alternatively be a GRE control packet sent by the HAAP to the HG, and the GRE control packet carries an acknowledgement number field. Specifically, the HAAP uses a sub-link number in a received data packet as an acknowledgement number to construct the acknowledgement number field, and returns the acknowledgement number field to the HG.

The HG dynamically adjusts the size of the DSL sending window based on an acknowledgement response returned by the HAAP by using the DSL tunnel, and dynamically adjusts the size of the DSL sending window based on an acknowledgement response returned by the HAAP by using the LTE tunnel.

The HG receives an acknowledgement response, and determines, based on an acknowledgement number included in the acknowledgement response, a data packet with which sub-link number is received. The HG increases a size of a corresponding sending window based on a specific proportion if the HG determines that the data packet is received, or decreases a size of a corresponding sending window based on a specific proportion if the HG determines that the data packet is not received.

For example, after the HG sends a data packet with a sub-link number 1 to the HAAP by using the DSL sending window, if the HG receives an acknowledgement response that includes an acknowledgement number 1 and that is returned by the HAAP by using the DSL receiving window, the HG increases the size of the DSL sending window by 1 KByte, changing the size to 4 KBytes. Likewise, if the HG receives an acknowledgement response that includes an acknowledgement number 2, the HG also increases the size of the DSL sending window by 1 KByte, changing the size to 5 KBytes. If the HAAP receives each of data packets with sub-link numbers 1, 2, and 3 that are sent by using the DSL sending window, and the HG receives acknowledgement responses that carry acknowledgement numbers 1, 2, and 3 and that are returned by the HAAP, the HG increases the size of the DSL sending window to 6 KBytes. The size is consistent with the size of the DSL receiving window, and is an upper limit of the size of DSL sending window.

On the contrary, after the HG sends a data packet with a sub-link number 1 to the HAAP by using the DSL sending window, if the HG does not receive, within preset duration, an acknowledgement response that includes an acknowledgement number 1 and that is returned by the HAAP by using the DSL receiving window, the HG decreases the size of the DSL sending window by half. For example, when the size of the DSL sending window is 3 KBytes, the HG decreases the size of the DSL sending window by half and then performs rounding, changing the size to 1 KByte or 2 KBytes.

In this way, the HG controls, in a "slow increase" and "rapid decrease" manner, a sending rate based on a status of receiving a data packet by the HAAP, to properly allocate traffics to the DSL tunnel and the LTE tunnel based on an actual network condition. Advertising a window size and an acknowledgement number by using a GRE control packet implements real-time monitoring on network bandwidth and automatic setting and adjustment on a sending window.

Figure 6:
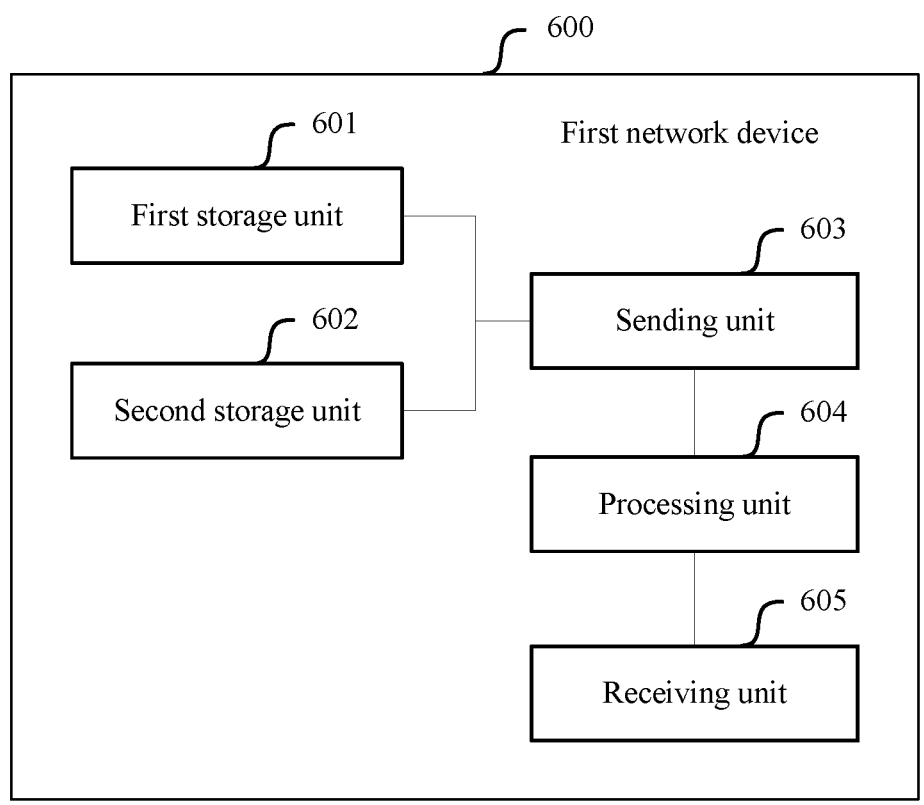
FIG. 6 is a first schematic structural diagram of a first network device in a hybrid access network according to an embodiment of this application.

Based on a same inventive concept as the packet processing method in a hybrid access network shown in FIG. 3, referring to FIG. 6, an embodiment of this application further provides a first network device 600 in a hybrid access network. The first network device may be configured to perform the method shown in FIG. 3. The first network device includes: a first storage unit 601, a second storage unit 602, a sending unit 603, a processing unit 604, and a receiving unit 605.

The first storage unit 601 is configured to store a first sending window.

The second storage unit 602 is configured to store a second sending window.

The sending unit 603 is configured to send a first data packet in the first sending window to the second network device by using the first tunnel, where the first data packet carries a first sub-link number, and the first sub-link number is used to represent a sequence number of the first data packet in the first tunnel.

The processing unit 604 is configured to: in response to receiving a first acknowledgement response sent by the second network device, increase a size of the first sending window based on a first proportion, where a first acknowledgement number is obtained based on the first sub-link number, and the first acknowledgement number is used to notify the first network device that the second network device has received the first data packet.

The processing unit 604 is further configured to: in response to not receiving, within a first predetermined time, the first acknowledgement response sent by the second network device, decrease, by the first network device, the size of the first sending window based on a second proportion, where the second proportion is greater than the first proportion.

The receiving unit 605 is configured to receive a second data packet, where a next hop through which the second data packet passes to arrive at a destination address is the second network device.

The processing unit 604 is further configured to: when determining that the size of the first sending window is greater than or equal to a first threshold, store the second data packet into the second storage unit, so that the second data packet enters the second sending window.

The sending unit 603 is further configured to send the second data packet to the second network device by using the second tunnel, where the second sending window and the second receiving window communicate with each other by using the second tunnel.

In a possible implementation, a priority of the first tunnel is higher than that of the second tunnel. The processing unit 604 is further configured to: before the sending unit 603 sends the first data packet in the first sending window to the second network device by using the first tunnel, determine that the size of the first sending window is less than the first threshold, and store the first data packet into the first storage unit, so that the first data packet enters the first sending window.

In a possible implementation, the first acknowledgement response is a third data packet, the third data packet includes an acknowledgement number field, and the acknowledgement number field carries the first acknowledgement number.

In a possible implementation, the first acknowledgement response is a first GRE control packet, and the first GRE control packet includes an acknowledgement packet attribute field. The acknowledgement packet attribute field includes an attribute type-length-value (TLV) field, and specifically includes an attribute type attribute type field, an attribute length attribute length field, and an acknowledgement number acknowledgement number field. The attribute type field indicates that a type of the acknowledgement packet attribute field is a type of notifying that a data packet is received, and the acknowledgement number field is used to carry the first acknowledgement number.

In a possible implementation, the second network device further includes a third storage unit, and the third storage unit is configured to store a first receiving window. The receiving unit 605 is further configured to: before the sending unit 603 sends the first data packet in the first sending window to the second network device by using the first tunnel, receive a notification packet sent by the second network device, where the notification packet is used to notify a size of the first receiving window, and the size of the first receiving window is M.

The processing unit 604 is further configured to: in response to receiving, by the receiving unit, the notification packet, set the size of the first sending window to L, where L<M, and both L and M are greater than 0.

In a possible implementation, the notification packet is a second GRE control packet. The second GRE control packet includes a window size attribute window size attribute field, and the window size attribute field includes an attribute type field, an attribute length field, and a window size window size field. The attribute type field indicates that a type of the window size attribute field is a type of notifying a window size, and the window size field is used to carry the size of the first receiving window.

In a possible implementation, the second data packet carries a second sub-link number, and the second sub-link number is used to represent a sequence number of the second data packet in the second tunnel.

Figure 7:
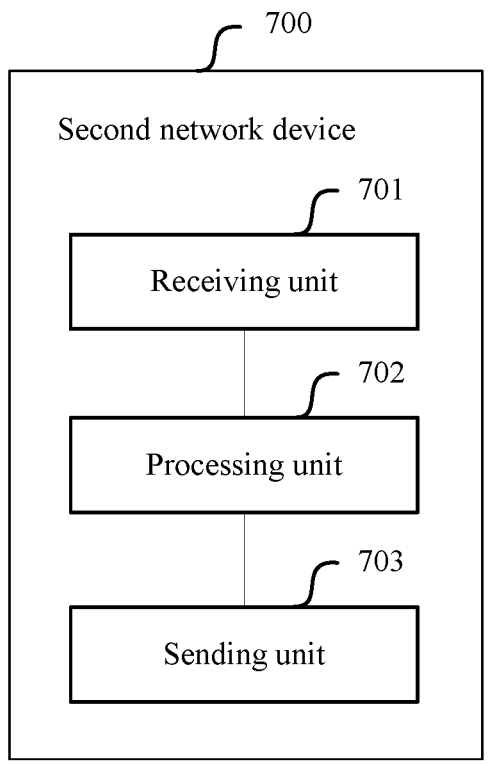
FIG. 7 is a first schematic structural diagram of a second network device in a hybrid access network according to an embodiment of this application.

Based on a same inventive concept as the packet processing method in a hybrid access network shown in FIG. 3, referring to FIG. 7, an embodiment of this application further provides a second network device 700 in a hybrid access network. The second network device may be configured to perform the method shown in FIG. 3. The hybrid access network includes a first network device and the second network device 700. A first tunnel and a second tunnel are established between the first network device and the second network device 700, and the first tunnel and the second tunnel are bound and connected to form a virtual binding tunnel. The first network device includes a first storage unit and a second storage unit. The first storage unit is configured to store a first sending window, and the second storage unit is configured to store a second sending window. The first network device may be specifically the first network device 600. The second network device 700 includes: a receiving unit 701, a processing unit 702, and a sending unit 703.

The receiving unit 701 is configured to: receive a first data packet that is in the first sending window and that is sent by the first network device by using the first tunnel, and receive a second data packet that is in the second sending window and that is sent by the first network device by using the second tunnel.

The first data packet carries a first sub-link number and a first global number, the first sub-link number is used to represent a sequence number of the first data packet in the first tunnel, and the first global number represents a sequence number of the first data packet in the virtual binding tunnel. The second data packet carries a second sub-link number and a second global number, the second sub-link number is used to represent a sequence number of the second data packet in the second tunnel, and the second global number is used to represent a sequence number of the second data packet in the virtual binding tunnel.

The processing unit 702 is configured to: store the first data packet and the second data packet into a sorting cache, and sort the first data packet and the second data packet based on the first global number and the second global number.

The sending unit 703 is configured to: after the processing unit 702 stores the first data packet into the sorting cache, send a first acknowledgement response to the first network device, so that the first network device increases a size of the first sending window based on a first proportion after receiving the first acknowledgement response. The first acknowledgement response carries a first acknowledgement number, and the first acknowledgement number is obtained based on the first sub-link number. The first acknowledgement number is used to notify the first network device that the second network device has received the first data packet.

The sending unit 703 is further configured to: after the processing unit 702 stores the second data packet into the sorting cache, send a second acknowledgement response to the first network device, so that the first network device increases a size of the second sending window based on a third proportion after receiving the second acknowledgement response. The second acknowledgement response carries a second acknowledgement number, and the second acknowledgement number is obtained based on the second sub-link number. The second acknowledgement number is used to notify the first network device that the second network device has received the second data packet.

In a possible implementation, the first acknowledgement response is a third data packet, the third data packet includes an acknowledgement number field, and the acknowledgement number field carries the first acknowledgement number.

In a possible implementation, the first acknowledgement response is a first GRE control packet, and the first GRE control packet includes an acknowledgement packet attribute field. The acknowledgement packet attribute field includes an attribute type attribute type field, an attribute length attribute length field, and an acknowledgement number acknowledgement number field. The attribute type field indicates that a type of the acknowledgement packet attribute field is a type of notifying that a data packet is received. The acknowledgement number field is used to carry the first acknowledgement number.

In a possible implementation, the sending unit 703 is further configured to:

before the receiving unit 701 receives the first data packet that is in the first sending window and that is sent by the first network device by using the first tunnel, send a first notification packet to the first network device, where the first notification packet is used to notify a size of a first receiving window, and the size of the first receiving window is used by the first network device to set the size of the first sending window; and before the receiving unit 701 receives the second data packet that is in the second sending window and that is sent by the first network device by using the second tunnel, send a second notification packet to the first network device, where the second notification packet is used to notify a size of a second receiving window, and the size of the second receiving window is used by the first network device to set the size of the second sending window.

In a possible implementation, the first notification packet is a second GRE control packet, and the second notification packet is a fourth GRE control packet. The second GRE control packet includes a window size attribute window size attribute TLV field, and the fourth GRE control packet includes a window size attribute window size attribute TLV field. The window size attribute TLV field in the second GRE control packet is used to carry the size of the first receiving window, and the window size attribute TLV field in the fourth GRE control packet is used to carry the size of the second receiving window.

The first storage unit, the second storage unit, and a third storage unit may be caches.

Figure 8:
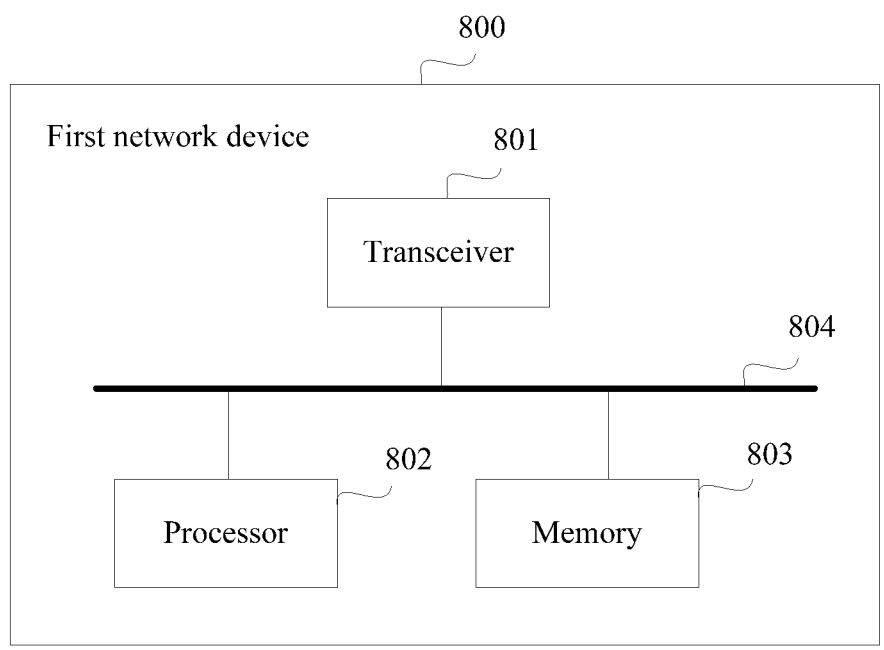
FIG. 8 is a second schematic structural diagram of a first network device in a hybrid access network according to an embodiment of this application.

Based on a same inventive concept as the packet processing method in a hybrid access network shown in FIG. 3, referring to FIG. 8, an embodiment of this application further provides a first network device 800 in a hybrid access network. The first network device 800 may be configured to perform the method shown in FIG. 3. The first network device 800 includes a transceiver 801, a processor 802, a memory 803, and a bus 804. The processor 802 and the memory 803 are connected by using the bus 804. The processor 802 is configured to execute code in the memory 803, and when the code is executed, the processor 802 performs the following operations:

sending a first data packet in the first sending window to the second network device by using the first tunnel, where the first data packet carries a first sub-link number, and the first sub-link number is used to represent a sequence number of the first data packet in the first tunnel;

in response to receiving a first acknowledgement response sent by the second network device, increasing a size of the first sending window based on a first proportion, where the first acknowledgement response carries a first acknowledgement number, the first acknowledgement number is obtained based on the first sub-link number, and the first acknowledgement number is used to indicate that the second network device has received the first data packet;

in response to not receiving, within a first predetermined time, the first acknowledgement response sent by the second network device, decreasing the size of the first sending window based on a second proportion, where the second proportion is greater than the first proportion;

receiving a second data packet, where a next hop through which the second data packet passes to arrive at a destination address is the second network device; and when determining that the size of the first sending window is greater than or equal to a first threshold, storing the second data packet into the second cache, so that the second data packet enters the second sending window; and sending, by the first network device, the second data packet to the second network device by using the second tunnel.

In a possible implementation, a priority of the first tunnel is higher than that of the second tunnel, and the processor 802 is further configured to:

before sending the first data packet in the first sending window to the second network device by using the first tunnel, determine that the size of the first sending window is less than the first threshold, and store, by the first network device, the first data packet into the first cache, so that the first data packet enters the first sending window.

In a possible implementation, the processor 802 is further configured to: before sending the first data packet in the first sending window to the second network device by using the transceiver 801, receive, by using the transceiver 801, a notification packet sent by the second network device, where the notification packet is used to notify a size of a first receiving window, and the size of the first receiving window is M; and in response to receiving, by the transceiver 801, the notification packet, set the size of the first sending window to L, where L<M, and both L and M are greater than 0.

The processor 802 is further configured to: after the transceiver 801 sends the second data packet to the second network device by using the second tunnel, in response to receiving a second acknowledgement response sent by the second network device, increase a size of the second sending window based on a third proportion, where the second acknowledgement response carries a second acknowledgement number, the second acknowledgement number and a second sub-link number are mapped to each other, and the second acknowledgement response is used to notify the first network device that the second network device has received the second data packet; and in response to not receiving, within a second predetermined time, the second acknowledgement response sent by the second network device, decrease the size of the second sending window based on a fourth proportion, where the fourth proportion is greater than the third proportion.

The processor 802 may be a central processing unit (English: central processing unit, CPU for short), a network processor (English: network processor, NP for short), or a combination thereof.

The processor 802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 803 may include a volatile memory such as a random access memory (RAM). Alternatively, the memory 803 may include a nonvolatile memory such as a flash memory, a hard disk drive (HDD), or a solid state drive (SSD). Alternatively, the memory 803 may include a combination of the foregoing types of memories.

Figure 9:
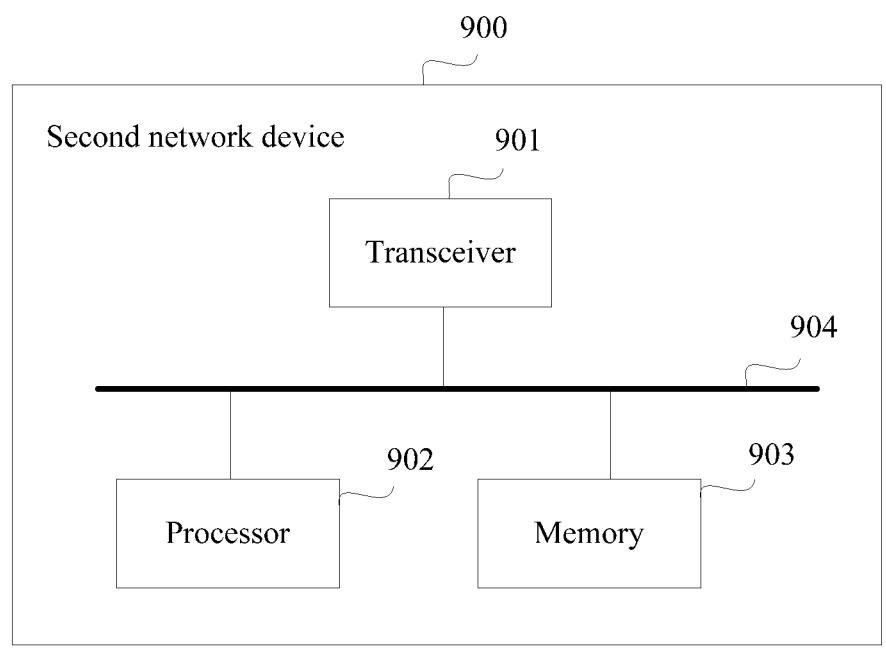
FIG. 9 is a second schematic structural diagram of a second network device in a hybrid access network according to an embodiment of this application.

Based on a same inventive concept as the packet processing method in a hybrid access network shown in FIG. 3, referring to FIG. 9, an embodiment of this application further provides a second network device 900 in a hybrid access network. The second network device 900 may be configured to perform the method shown in FIG. 3. The second network device 900 includes a transceiver 901, a processor 902, a memory 903, and a bus 904. The processor 902 and the memory 903 are connected by using the bus 904. The processor 902 is configured to execute code in the memory 903, and when the code is executed, the processor performs the following operations:

receiving a first data packet that is in the first sending window and that is sent by the first network device by using the first tunnel, where the first data packet carries a first sub-link number and a first global number, the first sub-link number is used to represent a sequence number of the first data packet in the first tunnel, and the first global number represents a sequence number of the first data packet in the virtual binding tunnel; receiving, by the second network device, a second data packet that is in the second sending window and that is sent by the first network device by using the second tunnel, where the second data packet carries a second sub-link number and a second global number, the second sub-link number is used to represent a sequence number of the second data packet in the second tunnel, and the second global number is used to represent a sequence number of the second data packet in the virtual binding tunnel; and storing, by the second network device, the first data packet and the second data packet into the sorting cache, and sorting the first data packet and the second data packet based on the first global number and the second global number;

in response to storing, by the second network device, the first data packet into the sorting cache, sending, by the second network device, a first acknowledgement response to the first network device, so that the first network device increases a size of the first sending window based on a first proportion after receiving the first acknowledgement response, where the first acknowledgement response carries a first acknowledgement number, the first acknowledgement number is obtained based on the first sub-link number, and the first acknowledgement number is used to notify the first network device that the second network device has received the first data packet; and in response to storing, by the second network device, the second data packet into the sorting cache, sending, by the second network device, a second acknowledgement response to the first network device, so that the first network device increases a size of the second sending window based on a third proportion after receiving the second acknowledgement response, where the second acknowledgement response carries a second acknowledgement number, the second acknowledgement number is obtained based on the second sub-link number, and the second acknowledgement number is used to notify the first network device that the second network device has received the second data packet.

In a possible implementation, the first acknowledgement response is a third data packet, the third data packet includes an acknowledgement number field, and the acknowledgement number field carries the first acknowledgement number.

In a possible implementation, the first acknowledgement response is a first GRE control packet. The first GRE control packet includes an acknowledgement packet attribute field, and the acknowledgement packet attribute field includes an attribute type attribute type field, an attribute length attribute length field, and an acknowledgement number acknowledgement number field. The attribute type field indicates that a type of the acknowledgement packet attribute field is a type of notifying that a data packet is received, and the acknowledgement number field is used to carry the first acknowledgement number.

In a possible implementation, the processor 902 is further configured to:

before receiving, by using the first tunnel, the first data packet that is in the first sending window and that is sent by the first network device, send a first notification packet to the first network device, where the first notification packet is used to notify a size of a first receiving window, and the size of the first receiving window is used by the first network device to set the size of the first sending window; and before receiving, by using the second tunnel, the second data packet that is in the second sending window and that is sent by the first network device, send a second notification packet to the first network device, where the second notification packet is used to notify a size of a second receiving window, and the size of the second receiving window is used by the first network device to set the size of the second sending window.

In a possible implementation, the first notification packet is a second GRE control packet, and the second notification packet is a fourth GRE control packet. The second GRE control packet includes a window size attribute window size attribute TLV field, and the fourth GRE control packet includes a window size attribute window size attribute TLV field. The window size attribute TLV field in the second GRE control packet is used to carry the size of the first receiving window, and the window size attribute TLV field in the fourth GRE control packet is used to carry the size of the second receiving window.

The processor 902 may be a central processing unit (CPU), a network processor (NP), or a combination thereof.

The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 903 may include a volatile memory such as a random access memory (RAM). Alternatively, the memory 903 may include a nonvolatile memory 1 such as a flash memory, a hard disk drive (HDD), or a solid state drive (SSD). Alternatively, the memory 903 may include a combination of the foregoing types of memories.

It should be noted that the apparatuses provided in FIG. 6 and FIG. 7 may be configured to implement the method shown in FIG. 3. In a specific implementation, the processing unit 604 in FIG. 6 may be implemented by using the processor 802 in FIG. 8, and the sending unit 603 and the receiving unit 605 both may be implemented by using the transceiver 801 in FIG. 8. The processing unit 702 in FIG. 7 may be implemented by using the processor 902 in FIG. 9, and the receiving unit 701 and the sending unit 703 both may be implemented by using the transceiver 901 in FIG. 9.

This application further provides a communications system, including a first network device and a second network device. The first network device may be the devices provided in the embodiments corresponding to FIG. 6 and FIG. 8. The second network device may be the devices provided in the embodiments corresponding to FIG. 7 and FIG. 9. The communications system is configured to perform the method in the embodiment corresponding to FIG. 3.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, or an optical memory) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly. For related parts, reference may be made to partial descriptions in the method embodiment.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A packet processing method in a hybrid access network, implemented by a first network device, the method comprising:
   sending data packets in a first sending window to a second network device via a first tunnel between the first network device and the second network device;
   based on an acknowledgement response from the second network device, adjusting a size of the first sending window, wherein in response to not receiving, within a first time, the acknowledgement response, decreasing the size of the first sending window based on a second proportion, wherein the second proportion is greater than a first proportion of the first sending window; and
   in response to the size of the first sending window being greater than or equal to a first threshold, sending subsequent received data packets in a second sending window to the second network device via a second tunnel between the first network device and the second network device.

2. The method according to claim 1, wherein the data packets comprise a first data packet, wherein the first data packet comprises a first sub-link number representing a sequence number of the first data packet in the first tunnel, and the adjusting the size of the first sending window comprises:
   in response to receiving the acknowledgement response, increasing the size of the first sending window based on the first proportion, wherein the acknowledgement response comprises an acknowledgement number obtained based on the first sub-link number.

3. The method according to claim 1, further comprising:
   receiving a second data packet, wherein a next hop through which the second data packet passes to arrive at a destination address is the second network device; and
   in response to determining that the size of the first sending window is greater than or equal to a first threshold, sending the second data packet to the second network device using the second tunnel.

4. The method according to claim 1, wherein:
   a priority of the first tunnel is higher than that of the second tunnel; and
   the sending the data packets via the first tunnel comprises:
   in response to determining that the size of the first sending window is less than the first threshold, sending the data packets via the first tunnel.

5. The method according to claim 2, wherein the acknowledgement response comprises an acknowledgement number field, and the acknowledgement number field comprises the acknowledgement number.

6. The method according to claim 1, wherein the acknowledgement response is a first generic routing encapsulation (GRE) control packet.

7. The method according to claim 1, wherein the second network device comprises a first receiving window, and wherein, before sending the data packets via the first tunnel, the method further comprises:
   receiving a notification packet sent by the second network device for notifying a size of the first receiving window, wherein the size of the first receiving window is M, and
   setting the size of the first sending window to L, wherein L<M, and both L and M are greater than 0.

8. The method according to claim 7, wherein the notification packet is a second GRE control packet carrying the size of the first receiving window.

9. A first network device in a hybrid access network, the first network device comprising:
   a non-volatile storage memory comprising instructions;
   a processor coupled to the memory, the instructions, when executed by the processor, configure the first network device to:
   send data packets in a first sending window to a second network device via a first tunnel between the first network device and the second network device;
   based on an acknowledgement response from the second network device, adjust a size of the first sending window, wherein in response to not receiving, within a first time, the acknowledgement response, decreasing the size of the first sending window based on a second proportion, wherein the second proportion is greater than a first proportion of the first sending window; and
   in response to the size of the first sending window being greater than or equal to a first threshold, send subsequent received data packets in a second sending window to the second network device via a second tunnel between the first network device and the second network device.

10. The first network device according to claim 9, wherein the data packets comprise a first data packet, wherein the first data packet comprises a first sub-link number representing a sequence number of the first data packet in the first tunnel, wherein the adjusting the size of the first sending window comprises:
    in response to receiving the acknowledgement response, increasing the size of the first sending window based on the first proportion, wherein the acknowledgement response comprises an acknowledgement number obtained based on the first sub-link number.

11. The first network device according to claim 9, wherein the instructions, when executed by the processor, further configure the first network device to:

receive a second data packet, wherein a next hop through which the second data packet passes to arrive at a destination address is the second network device; and in response to determining that the size of the first sending window is greater than or equal to a first threshold, send the second data packet to the second network device via the second tunnel.

12. The first network device according to claim 9, wherein:
a priority of the first tunnel is higher than that of the second tunnel; and
the instructions, when executed by the processor, further configure the first network device to: in response to determining that the size of the first sending window is less than the first threshold, send the data packets via the first tunnel.

13. The first network device according to claim 10, wherein the acknowledgement response comprises an acknowledgement number field, and the acknowledgement number field comprises the acknowledgement number.

14. The first network device according to claim 9, wherein the acknowledgement response is a first generic routing encapsulation (GRE) control packet.

15. The first network device according to claim 10, wherein the acknowledgement response comprising an acknowledgement packet attribute type-length-value (TLV) field, and the acknowledgement packet attribute TLV field comprises the acknowledgement number.

16. The first network device according to claim 9, wherein:
the second network device comprises a first receiving window; and
the instructions, when executed by the processor, further configure the first network device to:
before sending the data packets using the first tunnel, receive a notification packet sent by the second network device for notifying a size of the first receiving window, wherein the size of the first receiving window is M; and
set the size of the first sending window to L, wherein L<M, and both L and M are greater than 0.

17. The first network device according to claim 16, wherein the notification packet is a second generic routing encapsulation (GRE) control packet comprising the size of the first receiving window.

18. A second network device in a hybrid access network, the second network device comprising:
a non-volatile storage memory comprising instructions;
a processor coupled to the memory, the instructions, when executed by the processor, configure the second network device to:
receive a first data packet that is in a first sending window of a first network device and that is sent by the first network device by using a first tunnel between the first network device and the second network device;
receive a second data packet that is in a second sending window of the first network device and that is sent by the first network device by using a second tunnel between the first network device and the second network device;
store the first data packet and the second data packet into a sorting cache, and sort the first data packet and the second data packet;
send a first acknowledgement response to the first network device for instructing the first network device to increase a size of the first sending window, wherein in response to not receiving, within a first time, the first acknowledgement response, the first network device decreases the size of the first sending window based on a second proportion, wherein the second proportion is greater than a first proportion of the first sending window; and
send a second acknowledgement response to the first network device for instructing the second network device to increase a size of the second sending window.

19. The second network device according to claim 18, wherein:
the first data packet further comprises a first sub-link number, the first sub-link number represents a sequence number of the first data packet in the first tunnel; and
the first acknowledgement response comprises a first acknowledgement number, the first acknowledgement number is obtained based on the first sub link number.

20. The second network device according to claim 18, wherein:
the second data packet further comprises a second sub-link number, the second sub-link number represents a sequence number of the second data packet in the second tunnel; and
the second acknowledgement response comprises a second acknowledgement number, the second acknowledgement number is obtained based on the second sub link number.

* * * * *